United States Patent
Zhang et al.

(10) Patent No.: US 10,301,480 B2
(45) Date of Patent: May 28, 2019

(54) CHROMIUM-FREE INSULATION COATING COMPOSITION, METHOD FOR MAKING SAME, AND GRAIN ORIENTED SILICON STEEL SHEET

(71) Applicant: Wuhan Yuanrong Technology Co., Ltd., Wuhan (CN)

(72) Inventors: Gang Zhang, Wuhan (CN); Hu Gao, Wuhan (CN); Jun Liang, Wuhan (CN)

(73) Assignee: Wuhan Yuanrong Technology Co., Ltd., Wuhan (CN)

( * ) Notice: Subject to any disclaimer, the term of this patent is extended or adjusted under 35 U.S.C. 154(b) by 0 days.

(21) Appl. No.: 15/979,493

(22) Filed: May 15, 2018

(65) Prior Publication Data
US 2018/0355188 A1 Dec. 13, 2018

(30) Foreign Application Priority Data
Jun. 13, 2017 (CN) .................. 2017 1 04441933

(51) Int. Cl.
| | |
|---|---|
| C09D 5/08 | (2006.01) |
| C23C 24/10 | (2006.01) |
| C23C 26/00 | (2006.01) |
| H01B 3/08 | (2006.01) |
| H01B 19/02 | (2006.01) |
| C09D 1/00 | (2006.01) |
| C09D 7/40 | (2018.01) |
| H01F 1/18 | (2006.01) |
| C08K 3/22 | (2006.01) |

(52) U.S. Cl.
CPC .............. *C09D 5/084* (2013.01); *C09D 1/00* (2013.01); *C09D 7/67* (2018.01); *C23C 24/10* (2013.01); *C23C 26/00* (2013.01); *H01B 3/08* (2013.01); *H01B 19/02* (2013.01); *H01F 1/18* (2013.01); *C08K 3/22* (2013.01)

(58) Field of Classification Search
CPC .. C09D 1/00; C09D 5/084; C09D 7/67; C23C 24/00; C23C 26/00; H01B 3/08; H01B 19/02; H01F 1/18
See application file for complete search history.

(56) References Cited

U.S. PATENT DOCUMENTS

| | | | | |
|---|---|---|---|---|
| 6,500,886 | B1 * | 12/2002 | Yamamuro | C25D 3/22 205/244 |
| 7,850,792 | B2 * | 12/2010 | Tanaka | C23C 22/08 148/113 |
| 8,541,486 | B2 * | 9/2013 | Millero | B82Y 30/00 523/440 |
| 9,303,166 | B2 * | 4/2016 | Walters | C08F 283/006 |

FOREIGN PATENT DOCUMENTS

| | | | |
|---|---|---|---|
| CN | 102477552 A | * | 5/2012 |
| CN | 102516835 A | | 6/2012 |
| CN | 102634243 A | * | 8/2012 |
| CN | 105566970 A | * | 5/2016 |
| JP | 2000-054154 A | | 2/2000 |
| JP | 2000054154 A | | 2/2000 |
| KR | 20140063190 A | * | 5/2014 |
| WO | WO2007007417 A1 | | 1/2007 |

* cited by examiner

*Primary Examiner* — Anthony J Green

(57) ABSTRACT

A chromium-free insulation coating composition includes 100 parts by weight of a phosphate solution, 1-5 parts by weight of molybdate, 50-150 parts by weight of silica sol, 3-13 parts by weight of selenium dioxide, 1-10 parts by weight of metal oxide and/or metal hydroxide, 5-15 parts by weight of organic acid, 1-6 parts by weight of boric acid, and 100-300 parts by weight of water.

10 Claims, 3 Drawing Sheets

| | phosphate solution | | | ammonium molybdate | silica sol | nickel oxide | nickel hydroxide | boric acid | salicylic acid | selenium dioxide |
|---|---|---|---|---|---|---|---|---|---|---|
| | aluminum dihydrogen phosphate | manganese dihydrogen phosphate | zinc dihydrogen phosphate | | | | | | | |
| Example 1 | 100 | / | / | 1 | 50 | 1 | / | 1 | 5 | 3 |
| Example 2 | 100 | / | / | 5 | 150 | 10 | / | 5 | 15 | 5 |
| Example 3 | 100 | / | / | 3 | 120 | 6 | / | 3 | 15 | 5 |
| Example 4 | 100 | / | / | 3 | 120 | 6 | / | 3 | 10 | 8 |
| Example 5 | 50 | 50 | / | 3 | 120 | / | 6 | 3 | 10 | 8 |
| Example 6 | 60 | 20 | 20 | 3 | 120 | / | 6 | 3 | 10 | 8 |
| Example 7 | 40 | 30 | 30 | 3 | 120 | 3 | 3 | 3 | 15 | 10 |
| Example 8 | 40 | 30 | 30 | 3 | 120 | 3 | 3 | 3 | 10 | 8 |
| Example 9 | 40 | 30 | 30 | 3 | 150 | 3 | 3 | 3 | 10 | 8 |
| example10 | 60 | 20 | 20 | 3 | 120 | 5 | 5 | 3 | 15 | 10 |
| Comparison 1 | 100 | / | / | | 120 | / | / | 6 | / | / |
| Comparison 2 | 60 | 20 | 20 | 3 | 120 | / | 6 | 3 | / | / |
| Comparison 3 | 40 | 30 | 30 | 3 | 120 | 3 | 3 | 3 | 15 | / |
| Comparison 4 | 40 | 30 | 30 | 3 | 120 | 3 | 3 | 3 | / | 8 |
| Comparison 5 | 40 | 30 | 30 | 3 | 170 | 3 | 3 | 6 | 10 | 8 |
| Comparison 6 | 40 | 30 | 30 | 3 | 30 | 3 | 3 | 0.5 | 10 | 8 |
| Comparison 7 | 100 parts of aluminum dihydrogen phosphate + 120 parts of silica sol + 8 parts of chromic anhydride | | | | | | | | | |

FIG. 1

|  | Adhesion | Corrosion resistance | Interlaminar resistance ($\Omega \cdot cm^2$/steel) | Film tension (MPa) | Lamination coefficient (%) | film permeation resistance | Magnetic performance improvement B800 (T) | Magnetic performance improvement W17/50 (w/Kg) |
|---|---|---|---|---|---|---|---|---|
| Example 1 | ○ | Level 9 | 127 | 8.78 | 98 | ○ | 1.90 | 0.86 |
| Example 2 | ○ | Level 9 | 140 | 8.79 | 98 | ○ | 1.90 | 0.84 |
| Example 3 | ○ | Level 9 | 132 | 8.83 | 98 | ○ | 1.90 | 0.82 |
| Example 4 | ○ | Level 10 | 133 | 8.85 | 98 | ○ | 1.90 | 0.80 |
| Example 5 | ○ | Level 10 | 136 | 8.85 | 98 | ○ | 1.90 | 0.80 |
| Example 6 | ○ | Level 10 | 137 | 8.85 | 99 | ○ | 1.91 | 0.80 |
| Example 7 | ○ | Level 9 | 130 | 8.83 | 99 | ○ | 1.91 | 0.81 |
| Example 8 | ○ | Level 10 | 145 | 8.85 | 99 | ○ | 1.92 | 0.80 |
| Example 9 | ○ | Level 9 | 155 | 8.80 | 98 | ○ | 1.91 | 0.82 |
| example10 | ○ | Level 9 | 140 | 8.80 | 98 | ○ | 1.91 | 0.88 |
| Comparison 1 | △ | Level 8 | 88 | 7.80 | 95 | × | 1.89 | 0.96 |
| Comparison 2 | △ | Level 9 | 130 | 8.10 | 96 | △ | 1.90 | 0.94 |
| Comparison 3 | △ | Level 8 | 136 | 8.15 | 96 | △ | 1.91 | 0.92 |
| Comparison 4 | △ | Level 9 | 120 | 8.15 | 96 | △ | 1.91 | 0.91 |
| Comparison 5 | ○ | Level 8 | 129 | 8.15 | 96 | △ | 1.90 | 0.91 |
| Comparison 6 | × | Level 8 | 92 | 8.10 | 94 | × | 1.88 | 0.93 |
| Comparison 7 | ○ | Level 10 | 173 | 8.83 | 99 | ○ | 1.91 | 0.88 |

FIG. 2

| | phosphate solution | | | ammonium molybdate | silica sol | nickel oxide | nickel hydroxide | boric acid | salicylic acid | selenium dioxide | Mass ration of salicylic acid and selenium dioxide |
|---|---|---|---|---|---|---|---|---|---|---|---|
| | aluminum dihydrogen phosphate | manganese dihydrogen phosphate | zinc dihydrogen phosphate | | | | | | | | |
| Example 10 | 40 | 30 | 30 | 3 | 120 | 3 | 3 | 3 | 5 | 13 | 0.38 |
| Example 11 | 30 | 30 | 30 | 3 | 120 | 3 | 3 | 3 | 8 | 10 | 0.80 |
| Example 8 | 40 | 30 | 30 | 3 | 120 | 3 | 3 | 3 | 10 | 8 | 1.25 |
| Example 12 | 40 | 30 | 30 | 3 | 120 | 3 | 3 | 3 | 12 | 6 | 2.00 |
| Example 13 | 40 | 30 | 30 | 3 | 120 | 3 | 3 | 3 | 13 | 5 | 2.60 |
| Example 14 | 40 | 30 | 30 | 3 | 120 | 3 | 3 | 3 | 15 | 3 | 5.00 |

FIG. 3

| | Adhesion | Corrosion resistance | Interlaminar resistance (Ω·cm²/steel) | Film tension (MPa) | Lamination coefficient (%) | film permeation resistance | Magnetic performance improvement | |
|---|---|---|---|---|---|---|---|---|
| | | | | | | | B800 (T) | W17/50 (w/Kg) |
| Example 10 | △ | Level 9 | 141 | 8.50 | 98 | ○ | 1.90 | 0.90 |
| Example 11 | △ | Level 10 | 145 | 8.55 | 98 | ○ | 1.91 | 0.89 |
| Example 8 | ○ | Level 10 | 148 | 8.85 | 99 | ○ | 1.92 | 0.80 |
| Example 12 | ○ | Level 10 | 146 | 8.85 | 99 | ○ | 1.91 | 0.82 |
| Example 13 | ○ | Level 10 | 143 | 8.70 | 98 | ○ | 1.91 | 0.86 |
| Example 14 | △ | Level 9 | 142 | 8.53 | 98 | ○ | 1.92 | 0.89 |

CHROMIUM-FREE INSULATION COATING COMPOSITION, METHOD FOR MAKING SAME, AND GRAIN ORIENTED SILICON STEEL SHEET

TECHNICAL FIELD

The present disclosure relates to silicon steel, and more particularly relates to a chromium-free insulation coating composition, a method for making same, and a grain oriented silicon steel sheet.

BACKGROUND

Grain oriented silicon steel, as an important magnetic material, has excellent high magnetic induction and low iron loss properties, and is widely used as a core material for power transformers. Insulation coating formed on a surface of the grain oriented silicon steel not only has the effects of rust prevention, corrosion resistance, and insulation, but also tension generated on the surface can reduce the iron loss, reduce magnetostriction coefficient, and reduce energy consumption and noise of the transformer. Therefore, the insulation coating is an important part of the grain oriented silicon steel.

However, most of insulation coating contains chromates. Hexavalent chromium is always present in the surface coating of the steel sheet after chromate-containing insulation coating is applied to the steel sheet to form a film after high-temperature drying and sintering. If discarded steel sheets are not properly recovered, it will endanger human health and also seriously pollute the environment. While if the hexavalent chromium in the coating is recovered, cost will be greatly increased. Therefore, it is an urgent requirement for the silicon steel industry in domestic and abroad to develop silicon steel insulation coatings that do not contain toxic hexavalent chromium in the coating final product and have excellent comprehensive properties, and are easy to recycle. As an alternative to chromic anhydride, JP 2000169973 discloses a method of adding a boron compound instead of a chromium compound. JP 2000169972 discloses a method of adding an oxide colloid. However, regardless of which of the above techniques is used, the overall performance of the coating cannot be achieved comparable to that of a chromium-containing coating.

Therefore, the prior art, in particular, the chromium-free insulation coating with good performance has yet to be improved and developed.

DESCRIPTION OF DRAWINGS

FIG. 1 lists different compositions of chromium-free insulation coating.

FIG. 2 lists specific test methods for performance measuring.

FIG. 3 lists the formulations of Examples 10-14.

FIG. 4 lists the magnetic properties of the insulation coatings formed after coating using compositions of Examples 8 and 10-14.

DETAILED DESCRIPTION

Embodiments of the disclosure are described more fully hereinafter. The various embodiments of the invention may, however, be embodied in many different forms and should not be construed as limited to the embodiments set forth herein. Rather, these embodiments are provided so that this disclosure will be thorough and complete, and will fully convey the scope of the disclosure to those skilled in the art.

A chromium-free insulation coating composition is provided, which includes 100 parts by weight of a phosphate solution, 1-5 parts by weight of molybdate, 50-150 parts by weight of silica sol, 3-13 parts by weight of selenium dioxide, 1-10 parts by weight of metal oxide and/or metal hydroxide, 5-15 parts by weight of organic acid, 1-6 parts by weight of boric acid, and 100-300 parts by weight of water.

A coating composition has a solid content of 20% to 40%. The coating composition has a density of 1.1 g/ml to 1.3 g/ml. The coating composition has a viscosity of 10 seconds to 30 seconds (4# Ford Cup). The mass of the water is mainly adjusted according to the viscosity of the composition.

The phosphate solution has a solid content of 40% to 60%. The phosphate is preferably dihydrogen phosphate. The dihydrogen phosphate is preferably selected from any one of aluminum dihydrogen phosphate, calcium dihydrogen phosphate, nickel dihydrogen phosphate, manganese dihydrogen phosphate, magnesium dihydrogen phosphate, and zinc dihydrogen phosphate or mixture thereof in any ratio.

The metal oxide is selected from the group consisting of magnesium oxide, calcium oxide, barium oxide, barium oxide, zinc oxide, ferric oxide, cobalt oxide, and nickel oxide. The metal hydroxide is selected from the group consisting of magnesium hydroxide, calcium hydroxide, barium hydroxide, strontium hydroxide, zinc hydroxide, ferric hydroxide, cobalt hydroxide and nickel hydroxide. It can be understood that it is not limited to these metal oxides or metal hydroxides listed in the present disclosure.

Silica particles in the silica sol have a particle size of 1 to 10 nm. The mass percentage of silica particles in the silica sol is 20-30%. The silica particles are acidic or basic silica particles, preferably acidic silica particles.

The organic acid is selected from the group consisting of acrylic acid, citric acid, salicylic acid, glutamic acid, maleic acid, benzoic acid, and phenylacetic acid. It can be understood that the organic acid is not limited to these. As long as the organic acid is miscible with water, especially compatible with the other components of the coating composition, they are within the scope of our invention. Among them, the mass ratio of the organic acid to the selenium dioxide is preferably 1-2:1.

Molybdate is selected from ammonium molybdate or magnesium molybdate.

A method for making the chromium-free insulation coating composition is also provided, which includes the steps of:

Adding the phosphate solution and the boric acid and the water, stirring;

Adding the selenium dioxide and the organic acid, stirring; Adding the metal oxides and/or metal hydroxides and the molybdates to bring pH to 1-5;

Adding silica sol and stirring to obtain the chromium-free insulation coating composition.

An oriented silicon steel sheet includes a substrate and a chromium-free insulation coating formed on the surface of the substrate. The chromium-free insulation coating is obtained by coating the chromium-free insulation coating composition on the substrate surface including the following steps of applying the chromium-free insulation coating composition on the substrate surface of the oriented silicon steel sheet; drying the coated composition at a temperature of 350-500° C. for 30 seconds to 80 seconds, and then sintering and curing the coated composition at a temperature of 800° C. to 1000° C. for 50 s to 150 s; finally, forming the chromium-free insulation coating on the surface of the grain oriented silicon steel sheet. Dry film coating amount is controlled in the range of 2.0-7.0 g/m². The chromium-free insulation coating has a thickness of 1-5 microns.

The present invention is further illustrated by the following specific examples. FIG. 1 lists different compositions of chromium-free insulation coating.

It should be noted that mass of the water can be adjusted according to the requirements of the viscosity and solid content of the composition.

The insulation coatings of the examples and the comparative examples were applied on the surface of grain oriented silicon steel sheets. (Grain oriented silicon steel sheet can be categorized as different types of 0.18 mm, 0.2 mm, 0.23 mm, 0.27 mm and 0.3 mm based on thickness. And the grain oriented silicon steel sheet which had undergone secondary recrystallization annealing under high temperature was selected with thickness of 0.23 mm. Before coating, the grain oriented silicon steel sheet was placed in a 3.0% dilute sulfuric acid and allowed to soak at room temperature for 1 minute. Then it was rinsed with deionized water and a soft-bristle brush, and the surface moisture was quickly blown dry. The removal of surface ash such as magnesium oxide provided clean oriented silicon steel sheets for coating experiments.

The insulation coating composition was applied to the surface of the grain oriented silicon steel sheet by roller of the coating machine. The obtained coated silicon steel sheet was directly dried in a continuous drying oven at 450° C., and the coating amount was controlled at 2.0-7.0 g/m²; and then sintered in a continuous annealing furnace at 900° C. for 1 min. At last it was cooled after taking out, and the uniform chromium-free insulation coating was formed on the surface of the steel sheet. Then continue the later process.

After the coating test was completed, the sheet was tested for salt spray, interlaminar resistance, and magnetic properties, etc.

Specific test methods for performance measuring in FIG. 2 are as follows:

1) Test Methods for Film Tension:

The steel sheet was provided with double sided chromium-free insulation coating formed by composition coating. The steel sheet was cut into a 30 mm×280 mm test piece along the rolling direction. The insulation coating on one side of the test piece was removed. Lay the lying test piece up with one end fixing at 30 mm and measuring bend size of the other end. Bring the data into the following equation for calculation:

$$\sigma(MPa)=1.2152\times105\ (MPa)\times\text{sheet thickness (mm)}\times\text{bending (mm)}/250\ (mm)/250\ (mm).$$

2) Test Methods for Film Permeation Resistance are:

The test piece was sprayed with steam of 100° C. for 30 minutes to observe the discoloration of the appearance of the coating.

Evaluation methods: ○: substantially no discoloration Δ: partial discoloration x: completely discolored.

3) Test Methods for Coating Adhesion are:

Evaluation method: The test piece was bent into circles of φ10, 20, and 30 mm. A transparent tape was stuck on the bent part, and then the transparent tape was peeled off to visually observe the peeling of the insulation coating.

Evaluation Criteria: ○: No peeling at a time Δ: Partial peeling x: Large amount of peeling off 4) Test Methods for Corrosion Resistance are:

Evaluation method: before annealing: 12 hours in SST; after annealing: 5 hours in SST.

Evaluation criteria: The 10-point method is applied.

10: Red rust area 0% 9: Red rust area 0 to 1% 8: Red rust area 1 to 5% 7: Red rust area 5 to 10% 6: Red rust area 10 to 15% 5: Red rust area 15 to 25% 4: Red rust area 25 to 35% 3: Red rust area 35 to 45% 2: Red rust area 45 to 65% 1: Red rust area 65% or more.

As can be seen from FIG. 2, poor corrosion resistance and magnetic properties are in Comparative Example 1 including only aluminum dihydrogen phosphate, silica sol and boric acid. Comparing the comparative Example 2 with Example 6, $SeO_2$ and organic acid were not added in Comparative Example 2. Compared with the Example 7, only organic acid was added for Comparative Example 3. Compared with Example 8, only $SeO_2$ was added for Comparative Example 4. It can be seen that the corrosion resistance, surface tension and magnetic properties of Comparative Examples 2 to 4 are all inferior to examples of the present invention. The combination of $SeO_2$ and the organic acid used can improve the wettability of the coating solution, make the free phosphoric acid in the phosphate more stable, inhibit the erosion of the coating on the substrate, thus improving the corrosion resistance of the coating and simultaneously improving the magnetic properties of the grain oriented silicon steel. The magnetic properties of the steel sheet are comparable to those of the chromic anhydride used in Comparative Example 7. In addition, the synergistic use of $SeO_2$ and organic acids with other components such as phosphates, molybdates, metal oxides, and/or metal hydroxides can provide coatings with excellent adhesion, corrosion resistance, film permeation resistance and strong surface tension. The combined ratio between the dihydrogen phosphate salts is closely related to the viscosity of the phosphate solution, and the viscosity of the phosphate solution is also related to its adhesiveness. The combination of the three used in Example 8 was found to have the best compounding effect.

Meanwhile, the mass of the silica sol was increased or decreased and the mass of the boric acid was decreased in the Comparative Example 5 and Comparative Example 6 on the basis of Example 8. It can be seen that the suitable amount of boric acid helps to improve the corrosion resistance of the coating. If it is added with unsuitable quantity, magnetic properties and adhesion will also be affected. When the amount of the silica sol is less than 50 parts by mass, the effect of thermal expansion coefficient reducing of the insulation layer is small, and sufficient tension cannot be imparted to the steel sheet. Therefore, the effect of improving iron loss by forming the insulation film cannot be obtained. On the other hand, if it is more than 150 parts by mass of the silica sol, not only the insulation film will be easily crystallized during sintering, but also the hygroscopicity resistance will be deteriorated. Therefore, the amount of each of the preferred formulations of the present invention is within the above range.

In order to further explores the optimal mass ratio of organic acid and $SeO_2$, the mass ratio of organic acid and $SeO_2$ was adjusted on the basis of the formula of Example 8 (maintaining the total amount of the two unchanged), while maintaining other parameters unchanged. The formulations of Examples 10-14 in FIG. 3 were prepared.

The corrosion resistance, interlaminar resistance, and magnetic properties of the insulation coatings formed after coating using compositions of Examples 8 and 10-14 were mainly examined in FIG. 4.

As can be seen from FIG. 4, the optimal mass ratio of $SeO_2$ to organic acid is of 1-2, preferably 1.25. In the range of the optimal mass ratio of $SeO_2$ to organic acid, the resulting interfacial resistance and magnetic properties of the film are optimal.

It should be noted that the above description is only preferred embodiments of the present invention, and various modifications to these embodiments will be obvious to those skilled in the art. Therefore, the present invention will not be limited to these embodiments shown in the above. All equivalent changes and improvements made according to the scope of the present invention shall still fall within the scope of the patent of the present invention.

What is claimed is:

1. A chromium-free insulation coating composition comprising:
    100 parts by weight of a phosphate solution, 1-5 parts by weight of molybdate, 50-150 parts by weight of silica sol, 3-13 parts by weight of selenium dioxide, 1-10 parts by weight of metal oxide and/or metal hydroxide, 5-15 parts by weight of organic acid, 1-6 parts by weight of boric acid and 100-300 parts by weight of water.

2. The chromium-free insulation coating composition according to claim 1, wherein the mass ratio of the organic acid to the selenium dioxide is 1-2:1.

3. The chromium-free insulation coating composition according to claim 1, wherein the coating composition has a solid content of 20% to 40%, a density of 1.1 g/ml to 1.3 g/ml, and a viscosity of 10 seconds to 30 seconds.

4. The chromium-free insulation coating composition according to claim 1, wherein the metals in the metal oxides and metal hydroxides are selected from the group consisting of magnesium, calcium, strontium, barium, zinc, iron, cobalt, and nickel.

5. The chromium-free insulation coating composition according to claim 1, wherein silica particles of the silica sol have a particle size of 1 to 10 nm.

6. The chromium-free insulation coating composition according to claim 1, wherein the organic acid is selected from the group consisting of acrylic acid, citric acid, salicylic acid, glutamic acid, maleic acid, benzoic acid and phenylacetic acid.

7. A method for making the chromium-free insulation coating composition according to claim 1, comprising the steps of:
    adding the phosphate solution and the boric acid and the water, stirring;
    adding the selenium dioxide and the organic acid, stirring;
    adding the metal oxides and/or metal hydroxides and the molybdates to bring pH to 1-5; and
    adding silica sol and stirring to obtain the chromium-free insulation coating composition, the coating composition has a solid content of 20% to 40%, a density of 1.1 g/ml to 1.3 g/ml, and a viscosity of 10 seconds to 30 seconds.

8. A grain oriented silicon steel sheet comprising a substrate and a chromium-free insulation coating formed on the surface of the substrate, the chromium-free insulation coating obtained by coating the chromium-free insulation coating composition according to claim 1 on the surface of the substrate.

9. The grain oriented silicon steel sheet according to claim 8, wherein the chromium-free insulation coating is obtained by steps of:
    applying the chromium-free insulation coating composition on the substrate surface of the grain oriented silicon steel sheet;
    drying the coated composition at a temperature of 350-500° C. for 30-80 seconds; and
    sintering the coated composition at a temperature of 800-1000° C. for 50 s-150 s, thus for the chromium-free insulation coating on the substrate surface of the grain oriented silicon steel sheet, the gain oriented silicon steel sheet has a dry film coating amount of 2.0-7.0 $g/m^2$.

10. The grain oriented silicon steel sheet according to claim 9, wherein the grain oriented silicon steel sheet has a thickness of 1 to 5 microns.

\* \* \* \* \*